Nov. 17, 1970  T. J. SCARNATO ET AL  3,540,197
CUTTER BAR GAG LIMITING DEVICE
Filed July 27, 1967  2 Sheets-Sheet 1
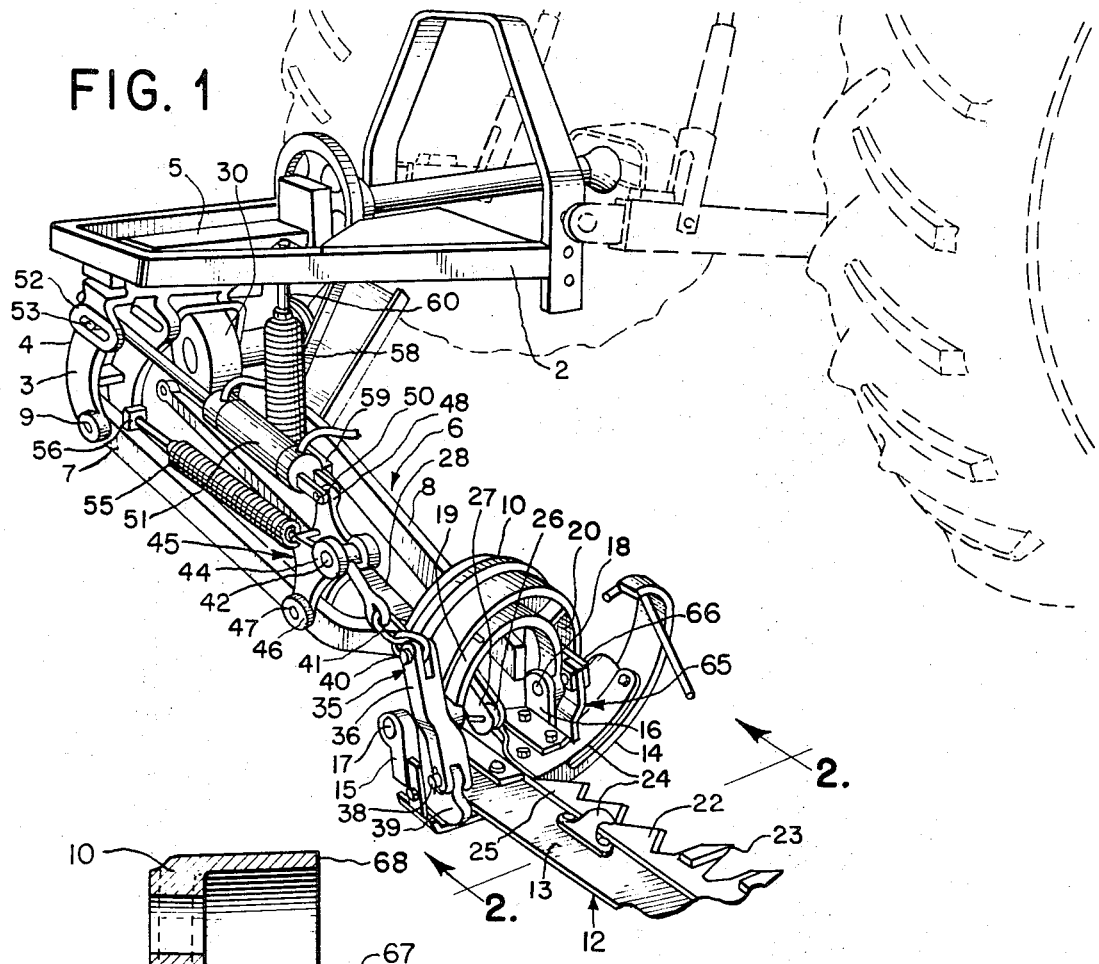
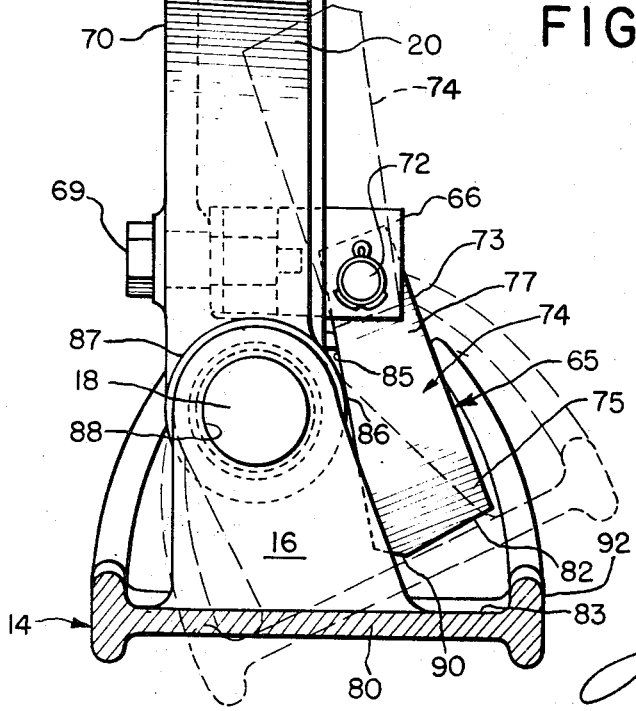
Inventors
Thomas J. Scarnato
Paul C. Gordon
Robert H. Brunker
John J. Kowalik
Attorney Inventors
Thomas J. Scarnato
Paul C. Gordon
Robert H. Brunker John J. Kowalik
Attorney

United States Patent Office 3,540,197
Patented Nov. 17, 1970

3,540,197
CUTTER BAR GAG LIMITING DEVICE
Thomas J. Scarnato, Park Ridge, Paul C. Gordon, Hinsdale, and Robert H. Brunker, Oak Lawn, Ill., assignors to International Harvester Company, Chicago, Ill., a corporation of Delaware
Filed July 27, 1967, Ser. No. 656,527
Int. Cl. A01d 55/02
U.S. Cl. 56—286          10 Claims

ABSTRACT OF THE DISCLOSURE

A gag lift limiting device for a pitman mower comprising a pivoted latch having an upswung position disengaged from cutter bar pivoted on mower frame to permit mower to be pivoted to transport position, the latch having its center of gravity slightly beyond its pivot point so that latch automatically drops into working position upon operation of mower.

---

This invention is an improvement on the structure shown in U.S. Pat. 3,302,376.

BACKGROUND OF THE INVENTION

Field of the invention

This invention is directed to pitman type mowers and more specifically to a novel gag limiting device therefor to prevent pitman breakage during operation of the device due to locking angularity between the knife and the pitman.

DESCRIPTION OF THE PRIOR ART

There is no device known to the applicants of the instant character. The only constructions known are for limiting the drop of the pitmans in double knife mowers to align the axes of pivot of the pitmans with the axis of pivot of the cutter bar. Such structure is shown in U.S. Pat. 2,806,340.

A general object of the invention is to provide a novel device for limiting the gaging of the mower bar during operation of a reciprocating cutter so as to preclude the mower bar from being pivoted beyond a critical angle with the respect to the pitman such as would cause the pitman to break.

A more specific object of the invention is to provide in a reciprocating type mower a novel pivot limiting device for the mower, said device comprising a latch pivoted on a substantially horizontal axis at a point above the cutter bar and depending therefrom and having a lower edge portion spaced a preselected amount from the cutter bar to accommodate movements of the cutter bar within the limits of the gap developed between the lower edge of the latch and the opposing portion of the cutter bar which is adapted to engage the lower edge of the latch.

A further and more specific object of the invention is to provide a novel latch mechanism which will automatically drop into its operating position immediately upon running of the mower.

Still more particular object of the invention is to provide in combination with a reciprocating mower of a type wherein the frame as well as the mower are caused to oscillate longitudinally, a novel latch which is pivoted on an axis transverse to the line of oscillation of the mower mechanism wherein the latch is so arranged that in its raised position it accommodates swinging of the lower bar about its axis of pivot to the mower frame to an upright transport position and wherein the latch is almost in balance over the pivot so that as the mower and the frame oscillate, the latch is caused to swing over- center and drop into its operating position whereby such positioning of the latch is not contingent upon the operator remembering to place it in such position but the disposition of the latch is in consequence of automatic response to the actuation of the mower.

These and other objects and advantages inherent in and encompassed by the invention become more apparent from the specification and the drawings wherein:

FIG. 1 is a perspective view of a mower incorporating the invention;

FIG. 3 is a cross-section view taken substantially on the line 3—3 of FIG. 2.

DESCRIPTION OF THE INVENTION

Figure 2:
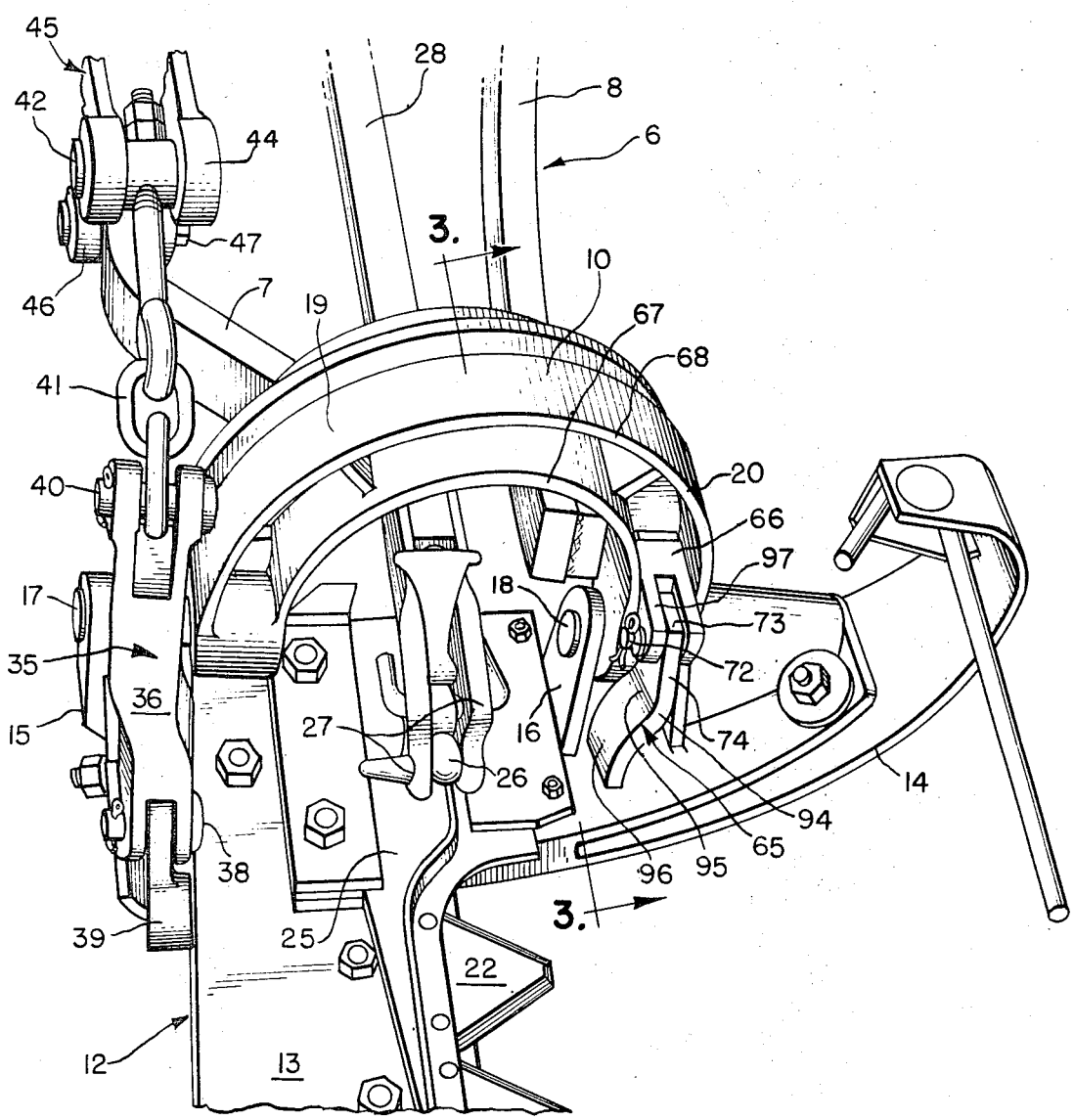
FIG. 2 is a further fragmentary perspective view taken substantially on the line 2—2 from FIG. 1.

Describing the invention in detail there is shown a mower of the type shown and described in the aforementioned U.S. Pat. 3,302,376 which includes a supporting frame 2, a supported pendulating frame assembly 3 including a pendular member 4 which oscillates about a generally horizontal axis of the resilient coupling 5. The supported structure 3 includes a coupling frame 6 which comprises frame members 7 and 8 which have coaxial pivot mountings at their inner ends as at 9 to the lower end of the pendulum element 4. The outer ends of the frame elements 7 and 8 are integrated with an inverted U-shaped yoke structure 10. The yoke structure 10 pivotally supports on the generally horizontal axis a mower bar or cutter generally designated 12 which includes a mower bar 13 the mower bar being mounted on an inner shoe structure 14 which has a pair of upstanding ears 15 and 16 which are respectively pivotally mounted on coaxial pins 17 and 18 to the legs 19 and 20 of the yoke structure 10.

The mower assembly 12 includes a reciprocating sickle or knife structure 22 which cooperates with conventional guards and ledger plates thereon 23, the knife assembly 22 being held in association with the ledger assembly 23 by means of hold down clips 24 in a conventional manner as well known to those skilled in the art. The knife assembly comprises a knife head 25 which has a ball member 26 embraced by a pair of complementary socket elements 27, 27 which are connected to the lower end of a pitman 28 the upper end of the pitman being connected to a crank 30 which is rotatably supported on the pendulum member 4.

As described in the beforementioned patent, the rotation of the counterweighted crank structure 30 causes the pitman to oscillate back and forth and drive the knife assembly. The pendulum member is so arranged that it will also oscillate about the fore and aft generally horizontal axis of the coupling 5 and thereby swinging the coupling structure 6 whereby the entire supported frame structure which includes the pendulum member 4 and the elements 7 and 8 as well as the yoke member 10 together with the mower assembly 12 are also oscillated back and forth transversely of the direction of movement of the mower across a field, that is generally longitudinally of the mower bar.

In operation of the mower there are frequently times when the operator in running down the field will encounter or observe obstructions such as stumps, stones or boulders in the path of cutter operation. He will therefore raise the mower to clear such obstruction. The linkage for accomplishing this is generally designated 35 and comprises a lifting link 36 having a lower end pivoted as at 38 to an ear 39 which is connected to the shoe structure 14 at a point outwardly and below the axis of pivot of the shoe structure on the pins 17 and 18 to the yoke 10. The upper end of the lifting link 36 is pivoted as at 40 to one end of a lost motion linkage in the nature of chain and rod assembly identified at 41, the other end of this linkage 41 being pivoted as at 42 to one leg 44 of the bell crank lever generally designated 45. The bell crank lever has its elbow portion 46 straddling and pivoted as at 47 to the member 7 and having its other leg 48 pivoted as at 50 to one end of a ram 51 which at its other end has a slidable pivotal mount as at 52 in a slot structure 53 in the pendulum member 4. Thus it will be seen that extension of the ram structure 51 towards the cutting mechanism 12 causes it to pivot about the horizontal pivot pins 17, 18 which are disposed transverse to the cutter and contraction of the ram assembly 51, which is a piston cylinder, causes the mower assembly to swing upwardly about the axis of the pin 17, 18. Counterbalancing tension spring 55 is connected at one end to the lever 44 and at its other end is anchored as at 56 to bracket structure which is mounted on the inner end of the frame member or coupling member 7. The entire coupling frame which includes the member 7, 8 and also yoke 10 are counterbalanced by a vertically acting tension spring 58 which at its lower end is suitably connected to a cross brace member 59 connected to the member 7, 8 and its upper end is connected as at 60 to the frame member 2.

The feature of the present invention involves novel gag limiting structure generally designated 65 which comprises an ear 66 suitably mounted between the flanges 67, 68 of the channel shaped element 10 and is bolted as by bolt 69 to the transverse web 70. The bifurcated ear structure 66 supports between the ears thereof a substantially horizontal pin 72 which provides a pivot for one end 73 of a latch element generally designated 74. Latch element 74 as best seen in FIG. 3 has a relatively wide distal end portion 75 which is offset laterally with respect to the inner end portion 77 in order to place the end portion 75 in vertical alignment with a generally flat bottom portion 80 of the shoe. It will be seen that portion 75 is wider than the portion 73 and that the latch element tapers toward its inner end and is somewhat trapezoidal in shape and has a substantially flat outer edge 82 which is adapted to provide flat face abutment with the upper surface 83 of the shoe as the mower together with the shoe is being tilted upwardly to gag position as seen in phantom lines in FIG. 3. It will be seen that the inner edge 85 of latch element 74 in its operating position bears against the vertical surface 86 of the embossment 87 which is disposed about the opening 88 through which the pin 18 extends in the leg 20 of the element 10. The latch element is disposed in operating position extending diagonally downwardly and since its center of gravity is beyond the axis of the pin 72, gravity biases the element 74 into its operating position that is lying against the surface 86. It will also be observed that the element 75 has its corner which normally would develop between the surfaces 85 and 82 sheared off as at 90 to insure clearance of this edge about the web 92 of the H section of the inner shoe.

It will also be observed that the offset which is best seen at 94 in FIG. 2 shows the function of providing an abutment surface 95 on the intermediate portion 96 of the latch against the upper edge 97 of the ear structure 66 so that in the elevated position as shown in phantom lines in FIG. 3 the latch is disposed with its center of mass slightly inwardly of the axis of the pin 72. Therefore the latch will remain in such raised position whereupon the operator may manually elevate the mower bar to transport position, that is, vertical secured in such place as well known. However, when the operator upon placing the mower bar in its normal operating position, and starting the mechanism, the reciprocation of the sickle together with the coupling frame structure causes the latch to swing overcenter and to drop into its operating position from the non-operating upper phantom line position shown in FIG. 3 to the solid line operating position.

It will be readily apparent that if the operator should actuate the ram, the mower bar will be caused to swing upwardly about the pins 17 and 18 until the top surface 83 of the inner shoe engages the surface 82 whereupon the entire mower assembly will then pivot about the axis of the pins 9 of the coupling frame. It will be apparent that the disposition of the mower bar including the sickle with reference to the pitman will never reach a critical angle such as will cause the pitman 28 to break.

It will also be observed that the latch mechanism will automatically fall into position as soon as the mower is operated and therefore no accidental or forgetful positioning will cause the parts to assume the critical angular relationship which will result in breakage of the pitman.

What is claimed is:

1. In a mower the combination of a support, a coupling frame pivoted to said support and swingable about a generally horizontal axis between a lowered position closely adjacent to the ground and an elevated position in which the coupling frame is positioned a substantial distance above the ground, a mower having a pivot to the frame on an axis generally parallel to said axis and having an extended position adjacent to the ground and swingable vertically to a gag position whereat said mower is inclined upwardly outwardly from the coupling frame, said mower having a reciprocable knife assembly, a drive including a pitman for reciprocating the knife assembly, a connection between one end of the pitman and said knife assembly permitting varying angular displacement between said knife assembly and pitman, and releasable cooperating means on said mower and said coupling frame engageable to limit angular displacement between the pitman and knife assembly to a working range.

2. The invention according to claim 1 and said cooperating means comprising a latch pivoted on said coupling frame in laterally offset relation to said pivot and swingable between a raised inoperative position accommodating upward pivoting of the mower to a transport position and an operating position engageable with the mower and limiting such upward pivoting to a working range of the connection between the pitman and knife assembly.

3. The invention according to claim 1 and said cooperating means comprising a latch pivoted to said coupling frame on an axis generally parallel with the axis of pivot of the mower with respect to the coupling frame at an elevation above the latter axis and outwardly thereof, said latch having an upper raised position whereat said latch is pivoted above its axis of pivot in abutment with a portion of the coupling frame there adjacent, and said latch having a dependent position and including a lower edge spaced vertically from the mower and abuttable therewith in consequence of the mower being pivoted a predetermined amount about its axis of pivot.

4. The invention according to claim 3 and said portion of the coupling frame comprising an inverted U-shaped yoke structure having a pair of legs to which said mower is pivoted, and said mower having an inner shoe structure providing a relatively flat area intermediate said legs, and said latch having outer and inner end portions, the inner end portion pivoted to one of said legs, and the outer end portion extending to a position in vertical alignment with said relatively flat area.

5. The invention according to claim 4 and said pivot of the latch including a bifurcated bracket attached to one of said legs, and said latch having an intermediate portion adapted to seat upon said bracket in the raised position of the latch.

6. The invention according to claim 5 and said latch in the raised position having its center of gravity disposed inwardly of the axis of pivot thereof.

7. The invention according to claim 1 and said coupling frame having a yoke structure, and said mower having an end portion beneath said yoke structure, and said cooperating means comprising a latch element, and said axis of pivot thereof being disposed outwardly and upwardly of the axis of pivot of the mower to the coupling frame, and said latch having an abutment surface, and said coupling arm having a stop engageable by said surface and positioning said latch in a downwardly and outwardly inclined position, and said latch in said last-mentioned position thereof having a lower edge angled outwardly and upwardly, and said mower having an upper surface engageable with said lower edge upon the mower being positioned at the inclination of said edge.

8. The invention according to claim 7 wherein said latch described in its pendant position has a wide lower portion and tapering upwardly to a relatively narrow upper portion.

9. The invention according to claim 8 wherein the latch has its upper and lower portions laterally offset.

10. The invention according to claim 9 and said yoke structure having a leg portion with a cavity therein nesting said latch therein in the raised position thereof.

References Cited
UNITED STATES PATENTS 274,793  3/1883  Leonard _____ 56—286

ROBERT PESHOCK, Primary Examiner